United States Patent
Li

(10) Patent No.: US 11,280,678 B2
(45) Date of Patent: Mar. 22, 2022

(54) INFRARED THERMOMETER WHICH IS EASY TO BE CLEANED

(71) Applicant: Shenzhen Finicare Co., Ltd, Shenzhen (CN)

(72) Inventor: Chao Li, Guangdong (CN)

(*) Notice: Subject to any disclaimer, the term of this patent is extended or adjusted under 35 U.S.C. 154(b) by 293 days.

(21) Appl. No.: 16/556,247

(22) Filed: Aug. 30, 2019

(65) Prior Publication Data

US 2021/0010867 A1 Jan. 14, 2021

(30) Foreign Application Priority Data

Jul. 11, 2019 (CN) .......................... 201921083390.8

(51) Int. Cl.
*G01J 5/00* (2006.01)
*G01J 5/02* (2022.01)
*G01J 5/04* (2006.01)

(52) U.S. Cl.
CPC ............. *G01J 5/0011* (2013.01); *G01J 5/021* (2013.01); *G01J 5/028* (2013.01); *G01J 5/048* (2013.01); *G01J 5/049* (2013.01)

(58) Field of Classification Search
CPC ........ G01J 5/0025; G01J 5/049; G01J 5/0011; G01J 5/02; G01J 5/04; G01J 5/0022; G01J 5/0265; G01J 5/21; G01J 5/028; A61B 5/01; A61B 5/6814; A61B 5/02433; A61B 5/6817; A61B 5/6815; G01K 13/223; G01K 13/25
USPC ...................................................... 702/135
See application file for complete search history.

(56) References Cited

U.S. PATENT DOCUMENTS

| | | | | |
|---|---|---|---|---|
| 5,017,018 A | * | 5/1991 | Iuchi .......................... | G01J 5/02 250/346 |
| 6,203,193 B1 | * | 3/2001 | Egawa ....................... | G01J 5/02 374/126 |
| 6,751,497 B2 | * | 6/2004 | Fraden ....................... | G01J 5/04 374/E13.003 |
| 7,815,367 B2 | * | 10/2010 | Lane ......................... | G01K 1/18 374/121 |
| 9,417,139 B2 | * | 8/2016 | Zhao ...................... | G01J 5/0011 |
| 9,442,024 B2 | * | 9/2016 | Shih ...................... | G01J 5/0205 |
| 10,078,021 B2 | * | 9/2018 | Larsen ..................... | A61B 5/01 |
| 10,281,332 B2 | * | 5/2019 | Liang ...................... | G01J 5/021 |
| 10,656,030 B2 | * | 5/2020 | Ou Yang ................ | G01K 13/20 |
| 10,801,894 B2 | * | 10/2020 | Lin .......................... | G01J 5/049 |
| 11,105,683 B2 | * | 8/2021 | Chen ...................... | G01J 5/0846 |
| 2004/0095985 A1 | * | 5/2004 | Ko ............................. | G01J 5/02 374/100 |
| 2004/0233968 A1 | * | 11/2004 | Tabata ..................... | G01J 5/522 374/121 |
| 2007/0127545 A1 | * | 6/2007 | Lee ............................ | G01J 5/06 374/131 |

(Continued)

*Primary Examiner* — Gail Kaplan Verbitsky

(74) *Attorney, Agent, or Firm* — Prakash Nama Global IP Services, PLLC

(57) ABSTRACT

An infrared thermometer, having an upper shell, a lower shell, an ear temperature probe, and a forehead temperature head; the ear temperature probe is provided with an infrared sensor, an infrared sensor copper sleeve and a probe body; a piece of flat and smooth transparent glass is provided between an end of the probe body having a smaller inner diameter and the infrared sensor copper sleeve, so that the end of the ear temperature probe inserted into the ear canal is configured as a flat surface by the transparent glass.

3 Claims, 4 Drawing Sheets

(56) References Cited

U.S. PATENT DOCUMENTS

| | | | | |
|---|---|---|---|---|
| 2007/0291820 A1* | 12/2007 | Yang | .................. | G01J 5/049 |
| | | | | 374/121 |
| 2008/0298429 A1* | 12/2008 | Harr | .................. | G01J 5/04 |
| | | | | 374/121 |
| 2013/0006138 A1* | 1/2013 | Ho | .................. | A61B 5/0059 |
| | | | | 600/549 |
| 2014/0153610 A1* | 6/2014 | Shih | .................. | G01J 5/0205 |
| | | | | 374/121 |
| 2018/0340833 A1* | 11/2018 | Liang | .................. | G01J 5/021 |
| 2020/0025617 A1* | 1/2020 | Lin | .................. | G01J 5/049 |
| 2021/0045638 A1* | 2/2021 | McDuffie | .................. | G01K 7/00 |
| 2021/0108965 A1* | 4/2021 | Wang | .................. | G01J 5/0011 |

* cited by examiner

INFRARED THERMOMETER WHICH IS EASY TO BE CLEANED

BACKGROUND OF THE INVENTION

The present invention relates to the technical field of infrared thermometer, and more specifically relates to an infrared thermometer which is easy to be cleaned, and which can be embodied as an infrared ear thermometer or an infrared forehead thermometer.

Ear temperature can more accurately reflect the central temperature of a human body among various types of body temperature measurements because eardrum is adjacent to the hypothalamus inside the brain, and hypothalamus is a temperature control center of the human brain. Medical research found that body temperature indicated by ear temperature is more accurate than oral temperature and armpit temperature. As mentioned, since ear is the closest to the hypothalamus which controls body temperature, blood flow of the tympanic membrane of the ear has the same source as the hypothalamus, therefore the temperature inside the ear is the first to react to any change of body temperature, and so the ear temperature is the closest to the body temperature. Also, since the ear forms a closed cavity inside, ear temperature is less affected by external environment, as compared with other measurement sites (such as armpit). These characteristics of ear temperature make it possible to measure body temperature by measuring ear temperature. An infrared ear thermometer is an electronic thermometer that measures the body temperature of the human body through the ear canal, and can quickly display the body temperature. The infrared ear thermometer uses infrared sensor technology and software algorithms to measure and calculate temperature value.

In the market, a common infrared ear thermometer generally comprises an ear temperature probe, an ear temperature sleeve, a measurement button, a display, a power button, and a batter cover etc. Ear temperature is measured by inserting the ear temperature probe into the ear canal. However, a general and conventional ear temperature probe is recessed at the end that is inserted into the ear canal, dirt inside the ear canal may easily contaminate that end of the ear temperature probe during ear temperature measurement, and such contamination may not be easily found and cleaned. If the dirt is not cleaned for a prolonged period of time, the end of the ear temperature probe may be covered by dirt, thereby affecting the accuracy of temperature measurement.

BRIEF SUMMARY OF THE INVENTION

In view of the aforesaid disadvantages now present in the prior art, the present invention provides an infrared thermometer which is easy to be cleaned and which can be embodied as an infrared ear thermometer or an infrared forehead thermometer. By configuring the end of the ear temperature probe inserted into the canal as a flat surface via a silicon lens, dirt deposited therein can be easily found and cleaned, thereby maintaining the accuracy of temperature measurement of the infrared thermometer.

To fulfil the above objects, an infrared thermometer is provided, comprising an upper shell, a lower shell, an ear temperature probe and a forehead temperature head; the ear temperature probe is provided radially from inside to outside an infrared sensor, an infrared sensor copper sleeve and a probe body; a protective cap is provided at a head portion of the infrared sensor; the infrared sensor copper sleeve has a prismatic shape with an extension of the same prismatic shape but having a smaller diameter; the infrared sensor copper sleeve is provided with a through hole inside along a lengthwise direction thereof; the infrared sensor and the protective cap are inserted inside the through hole; the probe body has a flaring shape; a second through hole is provided inside the probe body along a lengthwise direction thereof; a piece of flat and smooth transparent glass is provided between an end of the probe body having a smaller inner diameter and the infrared sensor copper sleeve; a forehead temperature head sleeves the ear temperature probe, and is connected with the lower shell.

As a modification, the transparent glass is a silicon lens; the transparent glass has a hexagonal shape; the end of the probe body having a smaller inner diameter is provided with a hexagonal hole; the transparent glass is inserted into the hexagonal hole; the hexagonal hole may also be configured in other shapes.

As a modification, the ear temperature probe is connected with the lower shell via a connecting mechanism; the connecting mechanism comprises four hooks; the four hooks are evenly mounted circumferentially at a bottom surface of an end of the probe body having a larger inner diameter; a mouth is provided at one end of the lower shell; the four hooks pass through the mouth of the lower shell and hook against an inner end surface of the mouth of the lower shell, and then being fixed by a connecting ring.

As a modification, the connecting ring is supported within a circular space enclosed by the four hooks; the connecting ring is provided with two connecting ears; the two connecting ears pass through gaps between the hooks and abut against the mouth of the lower shell, and are fixedly connected to the lower shell via screws.

The present invention has the following beneficial effects:

The infrared thermometer provided by the present invention configures the end of the ear temperature probe inserted into the ear canal as a flat surface by using a silicon lens, and such silicon lens has good transparency that will not affect the measurement performed by the infrared sensor. Therefore, as compared with a recessed surface as in the prior art, a flat surface enables contamination thereon by the dirt from the ear canal to be easily found and cleaned, thereby maintaining the accuracy of temperature measurement. Also, by providing a forehead temperature head additionally, the ear temperature probe can be protected when it is not in use, and on the other hand, the present invention may as well be used as an infrared forehead thermometer.

REFERENCES IN THE FIGURES

Figure 1:
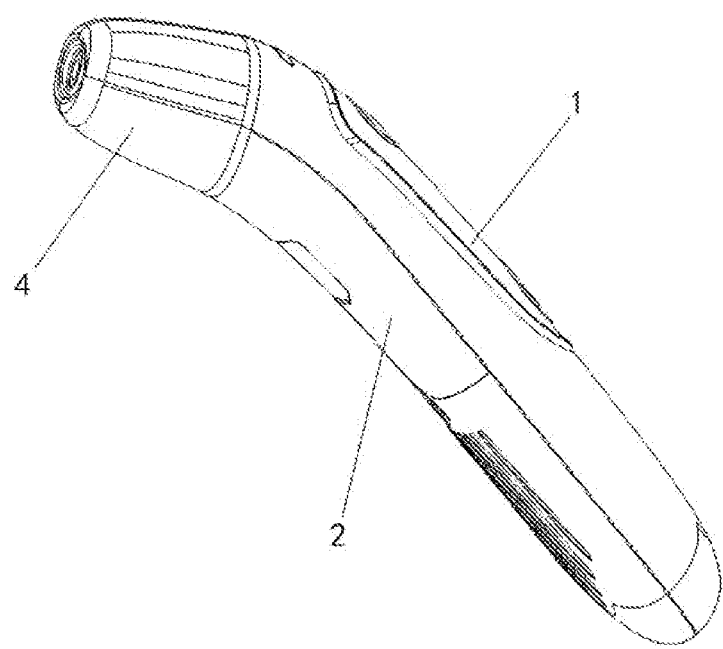
FIG. 1 is a schematic structural view of the present invention installed with the forehead temperature head.
Figure 2:
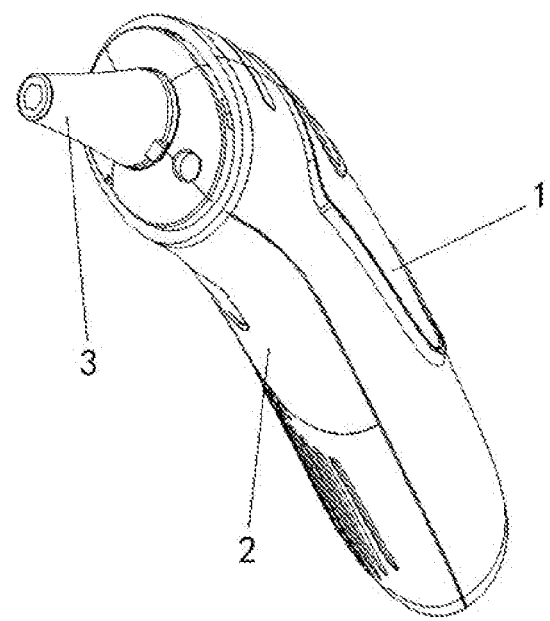
FIG. 2 is a schematic structural view of the present invention without the forehead temperature head.
Figure 3:
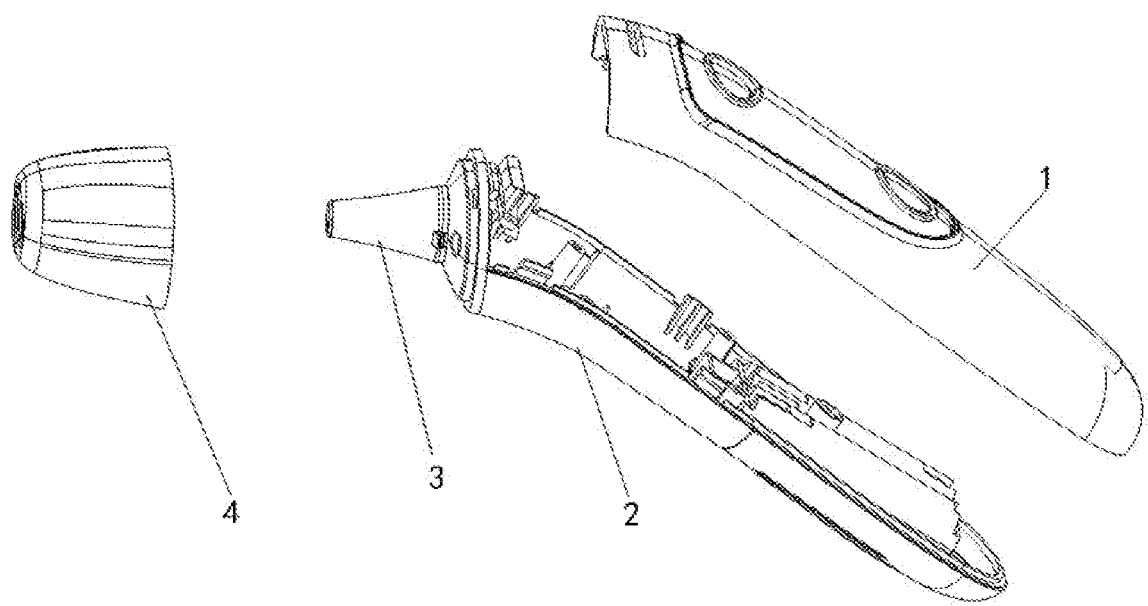
FIG. 3 is a schematic exploded structural view of the present invention.
Figure 4:
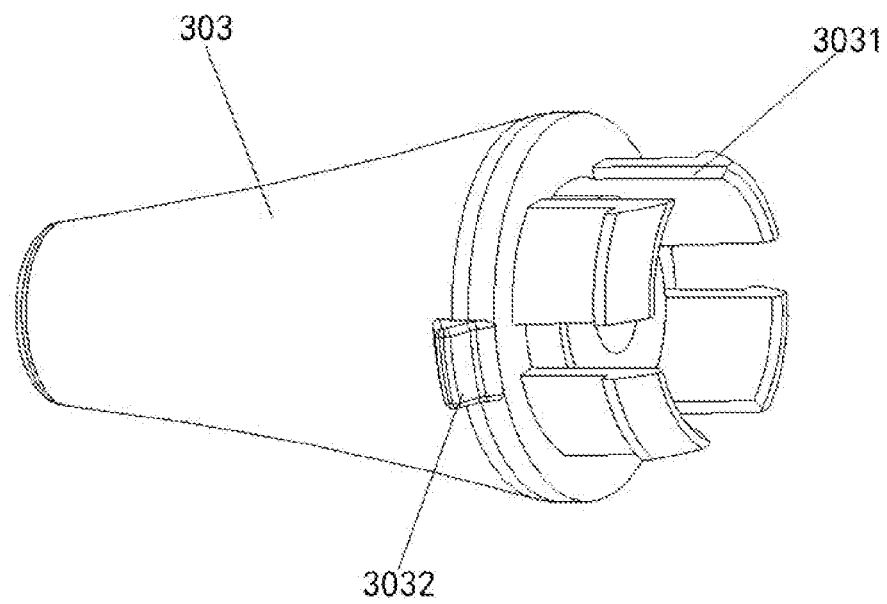
FIG. 4 is a schematic structural view of the ear temperature probe of the present invention.
Figure 5:
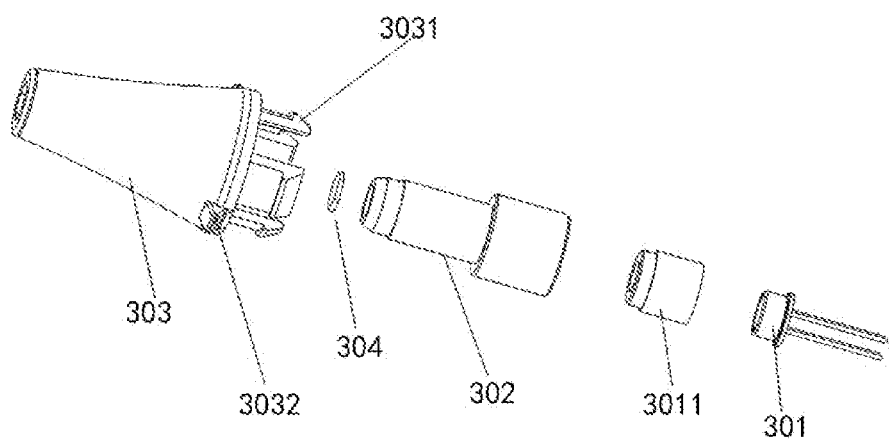
FIG. 5 is a schematic exploded structural view of the ear temperature probe of the present invention.
Figure 6:
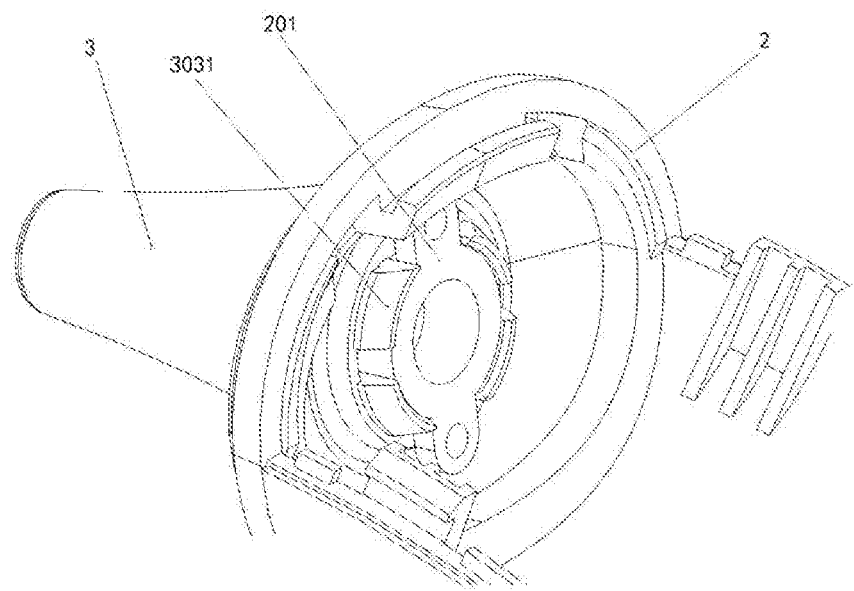
FIG. 6 is a schematic structural view showing connection between the ear temperature probe and the lower shell according to the present invention.
Figure 7:
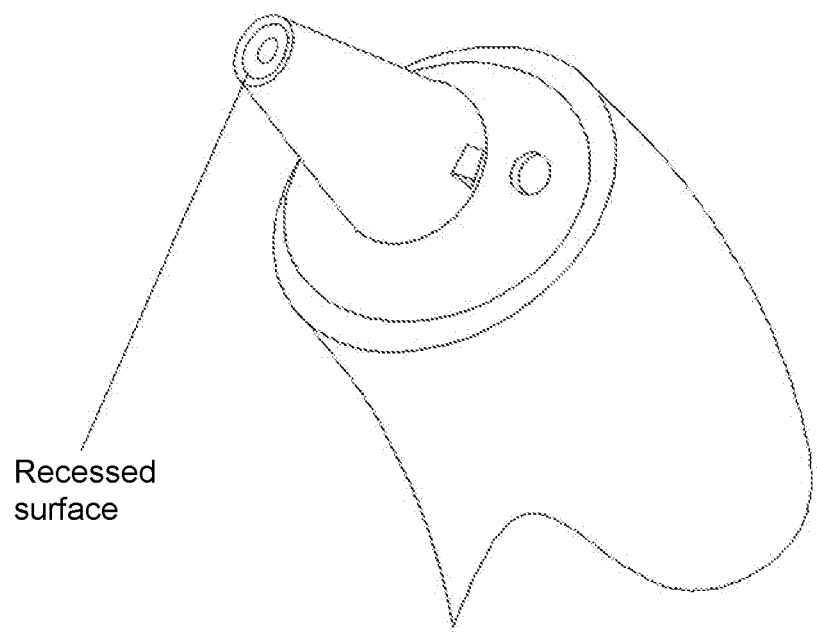
FIG. 7 is a schematic structural view of an ear temperature probe according to prior art.

1—Upper shell; 2—Lower shell; 201—connecting ring; 3—ear temperature probe; 301—infrared sensor;

3011—protective cap; 302—infrared sensor copper sleeve; 303—probe body; 3031—hooks; 3032—position limiting block; 304—transparent glass; 4—forehead temperature head.

DETAILED DESCRIPTION OF THE INVENTION

The present invention is further described in detail below with reference to the figures and the embodiments.

An infrared thermometer, comprising an upper shell 1, a lower shell 2, an ear temperature probe 3 and a forehead temperature head 4; buttons and a display portion is provided on the upper shell 1; a battery groove and a battery cover are provided at the lower shell 2; a control circuit board is positioned in a cavity formed between the upper shell 1 and the lower shell 2; a locking groove and a corresponding fastener are provided at the upper shell 1 and the lower shell 2 respectively so that the upper shell 1 and the lower shell 2 are connected together; alternatively, the upper shell 1 and the lower shell 2 are connected together via screws.

The ear temperature probe 3 is provided radially from inside to outside an infrared sensor 301, an infrared sensor copper sleeve 302 and a probe body 303; a protective cap 3011 is provided at a head portion of the infrared sensor 301; a tail portion of the infrared sensor 301 is connected to the control circuit board; the infrared sensor copper sleeve 302 has a prismatic shape with an extension of the same prismatic shape but having a smaller diameter; the infrared sensor copper sleeve 302 is provided with a through hole inside along a lengthwise direction thereof; the infrared sensor 301 and the protective cap 3011 are inserted inside the through hole such that the infrared sensor 301 is protected; the probe body has a flaring shape; a second through hole is provided inside the probe body 303 along a lengthwise direction thereof; the through hole has a stepped shape so as to accommodate the infrared sensor copper sleeve 302 correspondingly; also, a piece of flat and smooth transparent glass 304 is provided between an end of the probe body 303 having a smaller inner diameter and the infrared sensor copper sleeve 302; in this case, an end of the ear temperature probe 3 inserted into an ear canal is flat, instead of being recessed compared to the prior art; a flat shape enables dirt attached thereon from the ear canal to be easily found and cleaned, thereby maintaining the accuracy of temperature measurement. The transparent glass 304 is a silicon lens; the infrared sensor copper sleeve 302 and the probe body 303 are made of hard material; the transparent glass 304 has a hexagonal shape; the end of the probe body 303 having a smaller inner diameter is provided with a hexagonal hole; the transparent glass 304 is inserted into the hexagonal hole; since the silicon lens has good transparency, it will not affect the accuracy of temperature measurement of the infrared sensor 301. Likewise, the transparent glass 304 can have other shapes such as circular or polygonal shapes, and the end of the probe body 303 having a smaller inner diameter is provided with the hole having the same corresponding shape.

Specifically, the ear temperature probe 3 is connected with the lower shell 2 via a connecting mechanism. The connecting mechanism comprises four hooks 3031; the four hooks 3031 are evenly mounted circumferentially at a bottom surface of an end of the probe body 303 having a larger inner diameter; a mouth is provided at one end of the lower shell 2; the four hooks 3031 pass through the mouth of the lower shell 2 and hook against an inner end surface of the mouth of the lower shell 2, and then being fixed by a connecting ring 201; the connecting ring 201 is supported within a circular space enclosed by the four hooks 3031; the connecting ring 201 is provided with two connecting ears; the two connecting ears pass through gaps between the hooks 3031 and abut against the mouth of the lower shell 2, and are fixedly connected to the lower shell 2 via screws; the four hooks 3031 are pressed away from one another by the connecting ring so that they are maintained in position to hook against the inner end surface of the mouth of the lower shell 2. Further, an outer surface of an end of the probe body 303 proximal to the hooks 3031 is provided with a position limiting block 3032; the position limiting block 3032 has a conical shape to limit a depth which the probe body 303 is inserted into the ear canal.

Also, a forehead temperature head 4 sleeves the ear temperature probe 3; a locking groove and a corresponding fastener are provided at the forehead temperature head 4 and the lower shell 2 respectively so that they are mounted together. Further, the forehead temperature head 4 is made of hard plastic material; heat dissipation holes are provided on a sidewall of the forehead temperature head 4; on one hand, the forehead temperature head 4 can protect the ear temperature probe 3 when sleeving the ear temperature probe, since the ear temperature probe 3 is susceptible to be contaminated by dirt and dust because its outer surface is made of soft material; on the other hand, the forehead temperature head 4 sleeving the ear temperature probe enables the present invention to be quickly and conveniently adapted to be used as an infrared forehead thermometer.

Only the preferred embodiments of the present invention are described above. The description is not intended to limit the present invention by any sense. Although the present invention is disclosed above based on some preferred embodiments, they are not intended to limit the present invention. Changes or modifications can be possibly made by a person skilled in the art based on the teachings of the technical solutions disclosed above and without deviating from the technical scope of the present invention to attain alternative embodiments achieving equivalent technical effects. Any simple changes, variations and modifications achieving equivalent technical effects based on the teachings of the present invention and without deviating from the technical solutions provided by the present invention should also fall within the scope of protection of the present invention.

What is claimed is:

1. An infrared thermometer, comprising an upper shell, a lower shell and an ear temperature probe, wherein also comprising a forehead temperature head; the ear temperature probe is provided radially from inside to outside with an infrared sensor, an infrared sensor copper sleeve and a probe body; a protective cap is provided at a head portion of the infrared sensor; the infrared sensor copper sleeve has a prismatic shape with an extension of the same prismatic shape but having a smaller diameter; the infrared sensor copper sleeve is provided with a through hole inside along a lengthwise direction thereof; the infrared sensor and the protective cap are inserted inside the through hole; the probe body has a flaring shape; a second through hole is provided inside the probe body along a lengthwise direction thereof; a piece of flat and smooth transparent glass is provided between an end of the probe body having a smaller inner diameter and the infrared sensor copper sleeve; the forehead temperature head sleeves the ear temperature probe, and is connected with the lower shell; the transparent glass is a silicon lens; the transparent glass has a hexagonal shape; the end of the probe body having a smaller inner diameter is provided with a hexagonal hole; the transparent glass is inserted into the hexagonal hole.

2. The infrared thermometer of claim 1, wherein the ear temperature probe is connected with the lower shell via a connecting mechanism; the connecting mechanism comprises four hooks; the four hooks are evenly mounted circumferentially at a bottom surface of an end of the probe body having a larger inner diameter; a mouth is provided at one end of the lower shell; the four hooks pass through the mouth of the lower shell and hook against an inner end surface of the mouth of the lower shell, and being fixed by a connecting ring.

3. The infrared thermometer of claim 2, wherein the connecting ring is supported within a circular space enclosed by the four hooks; the connecting ring is provided with two connecting ears; the two connecting ears pass through gaps between the hooks and abut against the mouth of the lower shell, and are fixedly connected to the lower shell via screws.

\* \* \* \* \*